United States Patent [19]

Linhardt

[11] Patent Number: 4,471,795

[45] Date of Patent: Sep. 18, 1984

[54] CONTAMINATION FREE METHOD AND APPARATUS FOR TRANSFER OF PRESSURE ENERGY BETWEEN FLUIDS

[76] Inventor: Hans D. Linhardt, P.O. Box 1906, 1221 West Coast Hwy., Newport Beach, Calif. 92663

[21] Appl. No.: 241,096

[22] Filed: Mar. 6, 1981

[51] Int. Cl.³ ............................................... F04F 1/18
[52] U.S. Cl. .................................... 137/14; 137/240; 417/392; 417/137; 92/174
[58] Field of Search ............... 417/118, 137, 392, 540; 137/14, 240; 92/174

[56] References Cited

U.S. PATENT DOCUMENTS

| | | | |
|---|---|---|---|
| 2,232,198 | 2/1941 | Ashworth | 137/14 |
| 3,168,013 | 2/1965 | Williamson | 92/174 |
| 3,431,747 | 3/1969 | Hashemi et al. | 417/64 |
| 3,489,159 | 1/1970 | Cheng et al. | 137/14 |
| 3,730,203 | 5/1973 | Katzer et al. | 137/14 |

*Primary Examiner*—Alan Cohan
*Assistant Examiner*—John A. Rivell
*Attorney, Agent, or Firm*—McDougall, Hersh & Scott

[57] ABSTRACT

A means and apparatus for transfer of pressure energy from a first fluid at high pressure to a second fluid at lower pressure via a piston mounted for free floating movement within a cylinder communicating on one side with the first fluid and at the other side with the second fluid and in which contamination of the second fluid by the first fluid is prevented during energy transfer by exposing the one side of the piston to clean fluid for substantial equalization of pressures on opposite sides of the piston before exposure of the piston to the first fluid at high pressure.

15 Claims, 7 Drawing Figures

CONTAMINATION FREE METHOD AND APPARATUS FOR TRANSFER OF PRESSURE ENERGY BETWEEN FLUIDS

This invention relates to a method and apparatus for the transfer of energy from one fluid to another without contamination of the other fluid by the one fluid. It relates more particularly to a method and apparatus for efficient transfer of pressure energy from a pressurized process fluid, such for example as contaminated solvent, for energy conservation, without contamination of the depressurized and regenerated clean process fluid for return of said fluid to the high pressure part of the process.

For purposes of illustration and without limitation thereto, the invention will be described with reference to an energy exchange engine of the type described in the Chen-yen Cheng et al. U.S. Pat. No. 3,489,159 and the Hashemi et al. U.S. Pat. No. 3,431,747, wherein description is made of an apparatus for exchanging pressure energy between relatively high and relatively low pressure fluid systems, with the term fluid, as used herein, relating to liquids, with or without gases and/or solids dissolved therein, and pumpable mixtures of liquids and solids.

In the aforementioned Chen-yen Cheng et al. U.S. Pat. No. 3,489,159, description is made of an energy exchange engine for recovery of a substantial portion of the energy of a pressurized fluid system developed in the desalination of sea water by simultaneously depressurizing a first condensed liquid which provides a second condensed liquid. The energy exchange engine is generally based on a floating or free piston concept in which a free piston is disposed in a stationary cylinder for reciprocating movement within the cylinder upon input to the cylinder, in alternating fashion, of high pressure and low pressure fluids from two isolated systems, in which valving means are employed at opposite ends of the cylinder in which the free piston is mounted for reciprocal movement.

Figure 1:
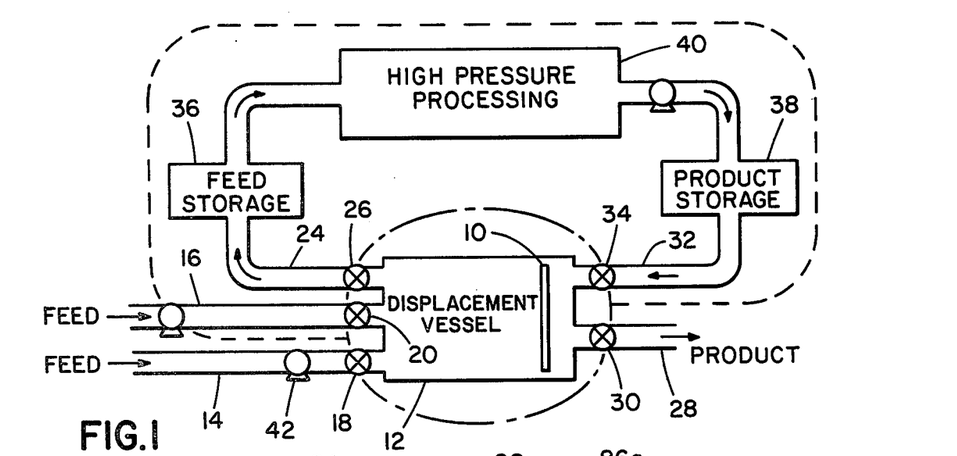
FIG. 1 is a schematic diagram illustrating the concepts of the energy exchange engine as described in the Chen-yen Chen et al. U.S. Pat. No. 3,489,159.

FIG. 1 of the drawings is illustrative of the work exchange engine of the type described in the U.S. Pat. No. 3,489,159 which is equipped with a movable solid partitioning member 10 within an elongate cylinder 12 which communicates at one end with low pressure inlet passages 14 and 16 controlled by valves 18 and 20 and a high pressure outlet passage 24 controlled by valve 26 and which communicates at the other end with a low pressure outlet passage 28 controlled by valve 30 and a high pressure inlet passage 32 controlled by valve 34. The high pressure outlet passage 24 is shown in communication with a feed storage 36 and the high pressure inlet passage 32 is shown in communication with a product storage 38, with the feed storage and product storage communicating with an intervening high pressure processing system 40.

In operation, as an energy exchange engine, when valves 18 and 30 are open, fluid at low pressure is pumped by pump 42 to introduce fluid through passage 14 into the cylinder 12 whereby the partitioning member 10 is displaced to the right in cylinder 12 to displace fluid from the opposite side of the partitioning member 10 for flow at low pressure through the open valve 30 into the low pressure passage 28. When, sequentially, valves 34 and 26 are opened and valves 18 and 30 are closed, product fluid from the processing unit 40, at high pressure, is introduced from passage 32 through open valve 34 into the cylinder 12, thereby pressurizing the low pressure feed fluid while actuating of the partitioning member 10 to the left in cylinder 12. This operates to displace fluid at high pressure from the opposite side of the partitioning member 10 through the open valve 26 to the feed storage 36.

The described displacement vessel, equipped with a solid partitioning member 10 is to be distinguished from a pump equipped with a movable piston. In the latter, the movable piston is used to pressurize a fluid by reciprocating motion. Under such circumstances, the piston is separating a fluid at two different pressures. Therefore, the cylinder of a pump requires a highly finished surface and elaborate packings are used to prevent fluid leaking across the partitioning member. On the other hand, since the solid partitioning member 10 in the displacement member of a fluid work exchanger of the type described usually separates two operating fluids at nearly equal pressures, the solid partitioning member can, for the most part, be more economically constructed with greater tolerance in the surface finish.

It has been found, however, that during the initial stages of changeover for introduction of a fluid through valve 18 into the cylinder 12, with concurrent removal of low pressure product fluid from the opposite side of the partitioning member 10, some leakage of the first fluid to the low pressure product fluid occurs, past the partitioning member until the two operating fluids reach the nearly equal operating pressures described. This undesirable contamination of the product fluid by the other has been found to occur even when the operating surfaces of the cylinder and partitioning member are highly finished to minimize leakage.

On numerous occasions, it is desirable to provide a fluid product characterized by a high degree of purity, such as required in the removal of contaminating gases and fluids from the process fluid, as represented by the removal of $CO_2$, COS and $H_2S$, from a process gas by solution in methanol or other solvents, such as in the Rectisol process. Under such circumstances, contamination of process fluid by leakage of impure fluid into clean process fluid militates against the utilization of the concepts of the energy exchange engine in the production of a purified product with the important conservation of energy.

Broadly described, it is an object of this invention to provide a method and apparatus for the transfer of energy from one pressurized fluid to another fluid without leakage of the one pressurized fluid for contamination of the other.

It is a related object of this invention to provide a method and apparatus for the improvement of a system of the type described whereby contamination of process fluid is eliminated or at least greatly minimized.

These and other objects and advantages of this invention will hereinafter appear, and for purposes of illustration, but not of limitation, embodiments of the invention are shown in the drawings in which:

With the knowledge that leakage during the initial stages of operation to introduce one fluid at high pressure to one side of a partitioning member for pressurization and following displacement of low pressure product fluid from the cylinder on the opposite side of the partitioning member cannot be avoided, contamination of the purified fluid is eliminated or at least greatly minimized in accordance with the practice of this invention by interposing a circuit between the outlet from the product side and the inlet to the feed side. The circuit includes a diaphragm loaded vessel which connects on one side with the high pressure contaminating fluid while the other side communicates with the high pressure product side or an external source of clean product or other non-contaminating fluid for replenishment of the other side of the vessel with clean product or non-contaminating fluid.

By the use of valves for control, the high pressure side of the cylinder can be initially connected with the side of the vessel containing clean fluid for use during the initial stages of conversion. When the pressures on both sides of the partitioning member reach substantial equilization, the normal mode of operation takes effect. As a result, the introduction of contaminating fluid into the cylinder is delayed until the pressures are about equal on both sides of the partitioning member, while the partitioning member is faced only with clean fluid from the vessel during the initial stages of the switching cycle. Thus leakage past the partitioning member, during the initial stages of the cycle, is of clean non-contaminating fluid thereby to avoid contamination of product fluid.

Figure 3:
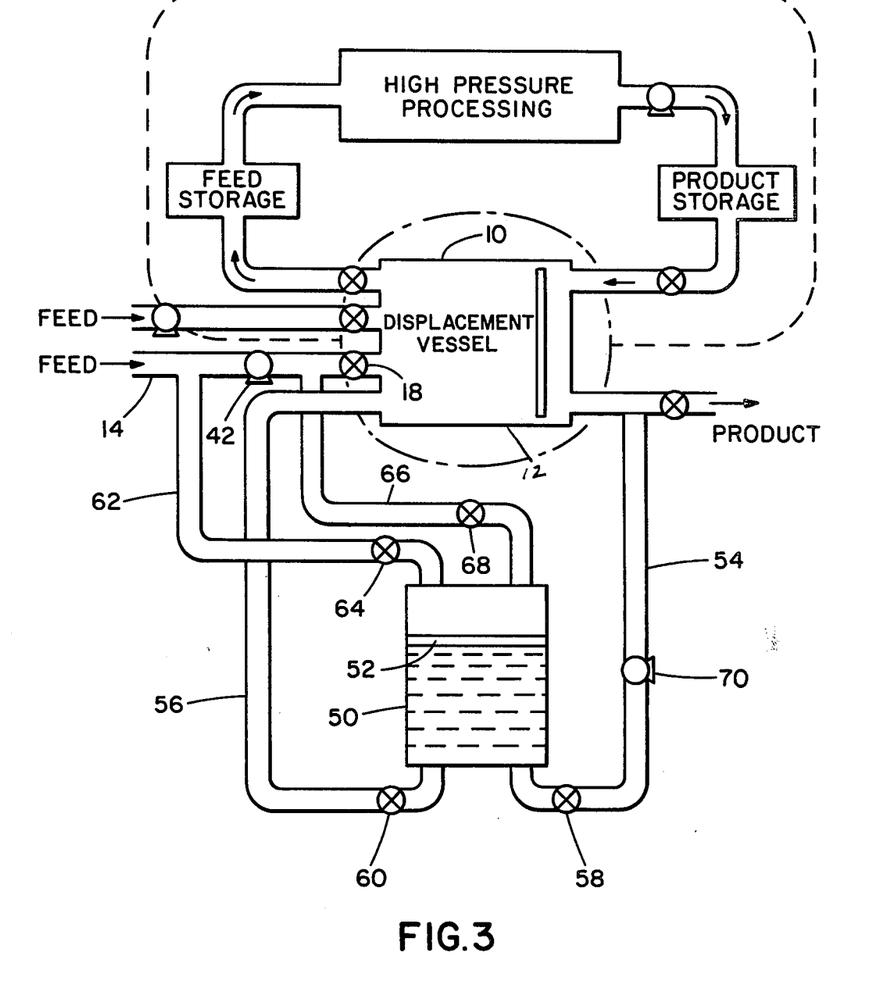
FIG. 3 is a schematic diagram showing the concepts of this invention embodied in apparatus of the type shown in FIG. 1 of the drawings.

Referring now to the FIG. 3 of the drawings for an illustration of the invention, numeral 50 indicates a cylinder having a piston 52 (or diaphragm) mounted for reciprocal movement therein. The head end of the cylinder is connected by line 54 with the product end of the exchange cylinder 10 and by line 56 with the feed end of the exchange cylinder 10. The control valve 58, in line 54, controls the flow of product fluid from the product end of the cylinder with the head end of the vessel 50 while the control valve 60, in line 56, controls the flow of fluid from the head end of the cylinder 50 to the feed end of the cylinder. A line 62, fitted with control valve 64, connects the base of the vessel 50 with the feed passage 14 upstream of the pump 42 and a line 66 fitted with the control valve 68 communicates the base of the vessel 50 with the feed passage downstream of the pump 42.

In operation, during displacement of the process fluid from the cylinder, valves 58 and 64 are open while valves 60 and 68 are closed. This enables product fluid pressurized by pump 70 to flow through line 54 into the vessel 50 with corresponding displacement of the diaphragm or piston 52 toward the base of the vessel, while feed fluid flows freely from the base of the vessel through line 62 to the feed line 14. Thus, the head end portion of the vessel 50 is filled with purified fluid under pressure.

Upon changeover, valves 18, 58 and 64 are closed while valves 60 and 68 are opened. This enables high pressure process fluid to be first introduced into the cylinder 10 from the vessel 50 so that the high pressure fluid initially coming into contact with the partitioning member 10 will be purified process fluid or other purified fluid. As a result, any leakage that occurs during the initial stages of changeover, will be non-contaminating fluid. The amount of high pressure fluid in the vessel 50 will be sufficient to supply high pressure fluid to the cylinder until substantial pressure equilization has been reached on both sides of the partitioning member 10. Thereafter, valves 60 and 68 are closed while valves 18, 58 and 64 are opened to feed contaminating fluid at high pressure into the cylinder 12 while process fluid is removed from the opposite end of the cylinder to flow through line 56 to product and through line 54 to refill the vessel 50 with purified process fluid.

Figure 2:
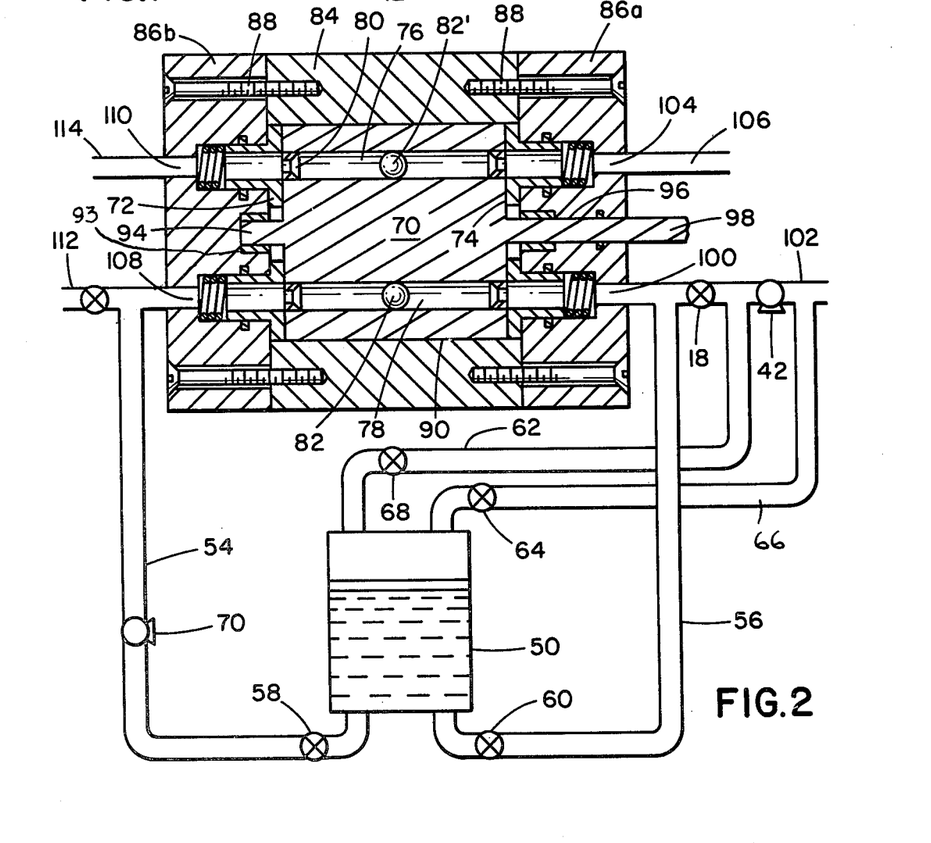
FIG. 2 is a schematic diagram showing the concepts of the energy exchange engine as described in the Hashemi et al. U.S. Pat. No. 3,431,747, with modification to incorporate the features of this invention.

As indicated previously, the inventive concept has equal application to other high pressure-low pressure equilization apparatus, such as the energy exchange engine of the type described in the Hashemi et al. U.S. Pat. No. 3,431,747, which, in FIG. 2 of the drawings, is depicted with the modification to include the concepts of this invention. The pressure exchange engine is shown in FIG. 2 as a solid cylindrical rotor 70 which has a pair of spaced, substantially planar end faces 72 and 74. Extending through the rotor 70 are a plurality of circumferentially spaced bores of generally circular cross section, two of which 76 and 78, are illustrated in FIG. 2 of the drawings. It will be understood that the rotor 70 can contain any number of pairs of bores extending therethrough.

The end portion of the bores are each provided with stops, such as projections 80, which block the axial movement of balls 82 which function as partitioning members within the bores. In practice, the balls 82 are formed of a hard rigid material, such as of metal, or a low density plastic which is resistant to the fluids being processed.

Surrounding and enclosing the cylindrical rotor 70 is a housing 84 having an enlarged cylindrical bore 90 in which the rotor 70 is mounted for rotational movement about a common axis. The ends of the bore are closed by closure end plates 86A and 86B shown secured by bolts 88 to the housing. The closure plate 86B is formed with a central recess 93 for journaling a stub axle 94 projecting from the end face 72 of the rotor while the closure plate 86A is provided with a bore 96 for passage of a drive shaft 98 therethrough for engagement with a driving means, such as an electrical motor, drive belt or the like (not shown) for actuation of the rotor for rotational movement in one direction relative to the structural housing.

An inlet 100 for low pressure fluid extends through the closure plate 86A and is provided with means for receipt of a conduit 102 for introduction of a low pressure fluid, provided with valving as previously described.

An outlet 104 for high pressure fluid extends through the closure plate 86A and is provided with means for a conduit 106 for the discharge of high pressure fluid from the bore. When only one inlet and one outlet are provided in the end plate 86A, such inlet and outlet are preferably spaced 180° apart.

A low pressure fluid outlet passage 108 and a low pressure fluid inlet passageway 110 communicate respectively with conduits 112 and 114 for the removal of low pressure feed fluid through passageway 108 and the introduction of high pressure feed fluid through passageway 110.

The passageways through the closure plates are located so as to be in alignment with the axially extending bores 76 and 78 through the rotor 70 when the rotor is in the position depicted in FIG. 2. As the rotor is rotated by power applied to the drive shaft 98, the axial bores 76 and 78 are moved out of alignment with the respective passageways. The bores 76 and 78 are disposed on the same circular path as the passageways through the closure plates. Thus the high pressure and low pressure fluid inlet and discharge passageways are consecutively brought into registry with the axially extending bores 76 and 78.

It will be understood that the device can be constructed with any number of pairs of aligned fluid inlet and outlet passageways through the closure plates. For clarity, operation of the device will be described with reference to a relatively simple pressure energy engine, as illustrated in FIG. 2.

A source of fluid A at pressure $P_2$ is connected via conduit 102 with the inlet passageway 100. The passageway 108 through closure plate 86B is connected to a relatively low pressure zone $P_3$. The high pressure inlet passageway 110 is connected by conduit 114 to a source of high pressure fluid B at pressure $P_1$. The high pressure discharge passageway 104 is connected by conduit 106 to a suitable fluid confining means which permits processed fluid under pressure to be pumped thereinto from the low pressure fluid discharge passageway 108.

During rotation of the rotor 70, the axial bores 76 and 78, are in consecutive sequence, brought into axial alignment with the passageways. At the instant that the rotor has been rotated to a position in which the axially extending bore 76 is aligned with the passageways 100 and 108, bore 78 has become aligned with the passageways 104 and 110. At this time, relatively low pressure fluid A, at pressure $P_2$, enters bore 76 to the right of ball 82 via the low pressure inlet passage 100. At the same time, fluid B which has previously been entrapped in the portion of the bore 76 to the left of the ball 82, is placed in communication with a low pressure environment and is discharged at low pressure through the discharge passageway 108 as the bass is displaced to the left in bore 76 by the higher pressure fluid entering through passageway 100.

Relatively low pressure fluid B, at pressure $P_1$, is entering bore 78 through the low pressure fluid passageway 110 drive the ball 82' to the right. This displaces entrapped fluid A previously introduced through the passageway 100. Continued impress of fluid B eventually drives the ball 82' to the right side of the bore 78 and completely displaces the fluid A at a pressure only slightly less than that of fluid B.

It will be seen that as the rotor 70 continues to rotate, the net effect is that, in being depressurized from its elevated pressure $P_1$ to pressure $P_2$, the high pressure fluid A is made to transfer effectively its energy of pressurization to the relatively lower pressure fluid B. The transfer is highly efficient due to the minimum energy required to displace the balls 82 and 82' in their respective bores.

Howver, as in the apparatus of Chen-yen Cheng et al. previously described, some leakage of fluid occurs as between the feed fluid A introduced into the bore 76 through passage 100 and the processed fluid B removed from bore 76 through passageway 108. This can be overcome, in accordance with the practice of this invention, by modification in the manner heretofore described, as by providing a separate vessel 50, connected by line 54 with the passageway 108 for filling the head end portion of the vessel 50 with purified fluid, while the base end portion of the vessel 50 is connected by line 62 to the conduit 102; and by connecting the head end portion of the vessel 50 through line 56 with the feed conduit 102 downstream of the pump 42, while the base end portion of the vessel 50 is connected by line 66 to the conduit 102 upstream of the valve 18. Thus purified fluid under pressure is fed from the vessel 50 to the bore 76 during the initial period of changeover to be replaced by normal flow of feed fluid after pressures on both sides of the ball 82 have substantially equalized. The vessel 50 is replenished with purified fluid from the outlet passageway 108 after normal operation has taken over by closing the valves 60 and 68 and opening the valves 58 and 64.

Instead of making use of a reciprocating member within the vessel for displacement of fluids therefrom, use can be made of a flexible fluid impervious diaphragm secured in sealing relation within the vessel to subdivide the vessel into a clean fluid compartment at the head end portion and a contaminated fluid compartment at the base end portion. By the use of such flexible sealed diaphragm, no leakage will occur for admixture of contaminated fluid from the base portion with clean fluid in the head end portion. As a result, only clean fluid will occupy the compartment in the head end portion of the vessel.

By way of further modification, line 62 and control valve 64 can be dispensed with while utilization is made of line 66 and valve 68 for controlled flow of fluid to the base end portion of the cylinder 50 during the displacement of pressurized fluid from the cylinder through line 56 and from the base end portion of the cylinder 50 during introduction of purified or other fluid from line 54.

Figure 5:
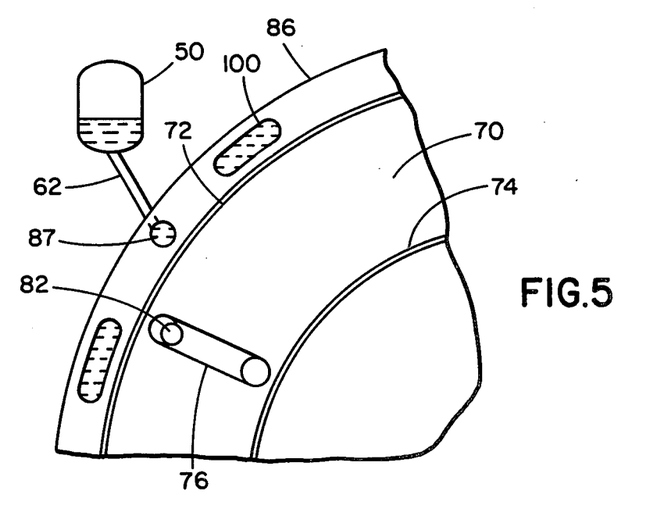
FIG. 5 is a schematic diagram showing the concepts of this invention in a manner adapted to be employed in a rotary energy exchange engine of the type shown in the Hashemi et al. U.S. Pat. No. 3,431,747.

As illustrated in FIG. 5 of the drawings, the rotary device is uniquely adapted for use in the practice of this invention, as by modification of the closure plate 86 to include a thin disc shaped recess 87 in the inner face of the closure plate, between the fluid outlet passageway and the fluid inlet arcuate passageway 100, and preferably closely adjacent the inlet passageway for the contaminated fluid, whereby the bores 76-78 come into registry with the recessed portion 87, after the bore has cleared the outlet passageway, but before coming into registry with the inlet passageway 100. The recessed portion or cavity 87 communicates through line 62 with the auxiliary vessel 50 to fill the cavity 87 with clean fluid under pressure.

In operation, after the contaminated fluid has been displaced from the bore 76 in response to displacement of the partitioning member 82, as shown in FIG. 5, the bore sequentially comes into registry with the disc arcuate shaped cavity 87 for pressure equalization with clean fluid from the cavity before the bore comes into registry with the inlet arc 100 for continued displacement of the partitioning member 82 through the bore 76 by the high pressure contaminated fluid.

Thus only a very small volume of clean liquid from the auxiliary vessel is utilized for proceeding the main flow of high pressure contaminated fluid into engagement with the partitioning member.

Figure 7:
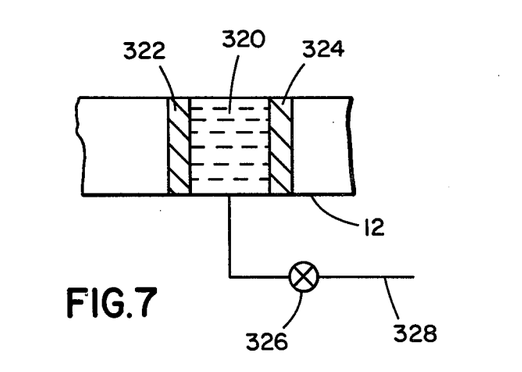
FIG. 7 is a sectional view showing a modification embodying the features of this invention.

In an alternative arrangement, as shown in FIG. 7, the replenishable supply of clean fluid can be housed within a chamber 320 provided between partitioning members 322 and 324 freely movable within the cylinder 12 whereby clean fluid can be introduced into the chamber 320 from the outlet or from a clean fluid source to fill the chamber defined by the spaced relation between the partitioning members 322 and 324. Thus, when high pressure contaminating fluid is introduced into the cylinder 12 to the left of the partitioning member 322, the pressure on the partitioning member 322 is imparted to the clean fluid in the chamber 320 so that only clean fluid can leak to the low pressure clean fluid side of the partitioning member during the initial stages of changeover and until pressure equalization is achieved during the continued displacement of the partitioning pair. When the stroke is completed, by proper valving as described for operation of valve 326, clean fluid is recycled through the line 328 to replenish the chamber 320 with clean fluid.

Having described the basic concepts of this invention, illustration will hereinafter be made, by way of non-limiting examples, in which the apparatus is employed as a component in a Rectisol process for the reduction of $H_2S$ and COS acid gas to 0.1 ppm or less and $CO_2$ to 10 ppm or less. The Rectisol process depends on the use of a clean solvent, such as methanol, in such processes as gas treatment, synthesis gas generation, hydrogen upgrading, and $CO_2$ production.

Figure 4:
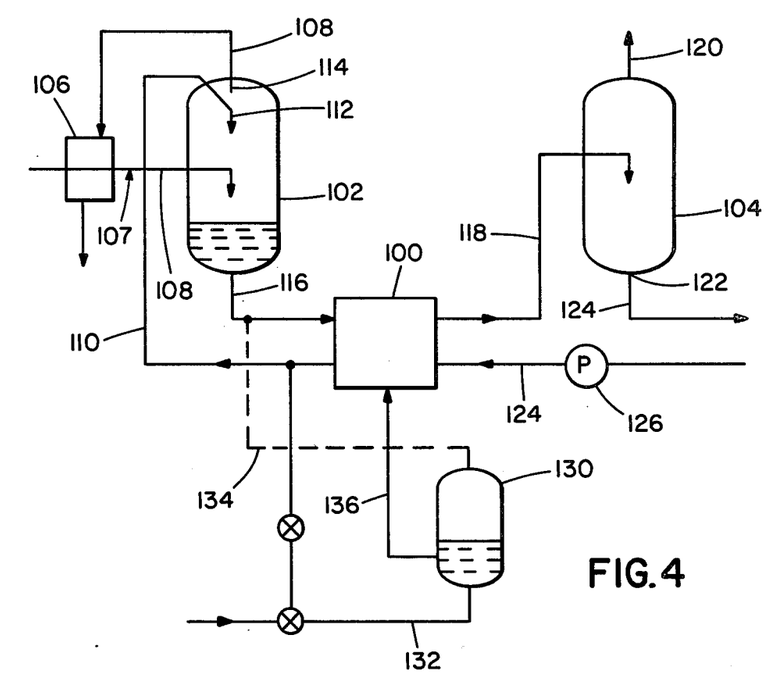
FIG. 4 is a schematic flow diagram embodying the features of this invention in a commercial Rectisol process.

FIG. 4 represents a simplified schematic diagram of a portion of a Rectisol process, modified to include an energy exchange engine 100 between a wash column 102 and a combined cold regeneration - $H_2S$ separation column 104. A warm regeneration portion of the process is omitted for the purpose of clarity in describing the functioning of an energy exchange engine 100 which employs the features of this invention to eliminate the possibility of contamination, by the feed gas; of the clean methanol used as the physical solvent of the Rectisol process.

The feed or dirty gas stream enters the Rectisol process through line 106 at a pressure of about 480 p.s.i.a. and at a temperature of about 110° F. The following is typical of the composition of the gas stream flowing through line 106, expressed in mol % of the feed gas:

| | |
|---|---|
| $H_2$ | 62.35 |
| $N_2$ | 0.20 |
| CO | 3.24 |
| $CH_4 + A_1$ | 0.49 |
| $CO_2$ | 33.23 |
| $H_2S$ | 0.49 |
| COS | 10 ppm |

The feed gas is passed through heat exchanger 106 in heat exchange relation with the cold product stream passing through line 108 from the top of the wash column 102. Methanol is introduced into the feed gas through line 107 to prevent plugging by ice.

Feed gas purification takes place in the wash column 102 where the feed gas enters at the mid portion of the column and is scrubbed with methanol introduced through line 110 into the upper end portion of the wash column 102 at 112. The purified acid free gas issuing from the column at 114, has the following composition:

| | |
|---|---|
| $H_2$ | 94.08 |
| $N_2$ | 0.33 |
| CO | 4.86 |
| $CH_4 - Ar$ | 0.73 |
| $CO_2$ | 10 ppm |
| $H_2S$ | — |
| COS | — |

For delivery of a product gas which has been substantially completely freed of acid gases, it is important for the methanol introduced into the wash column at 112 into engagement with the product gas issuing from the column at 114 to be substantially completely free of acid components. Thus when use is made of regenerated methanol, means should be employed in the regeneration process to prevent leakage of contaminated fluid toward the regenerated methanol.

This can be accomplished, in accordance with the practice of this invention, as will hereinafter be described. In the wash column, the freed gas is physically scrubbed with methanol at a temperature below 32° F. $H_2S$, COS and $CO_2$ will be extracted by the methanol which is collected at the bottom of the column and passed through line 116 to an energy exchange engine 100 of the type described, with reference to FIG. 2 of the drawings. The methanol and extracted acid gases enter the energy exchange engine 100 at a pressure $P_1$ of about 480 p.s.i.a. and at a temperature of about $-10°$ F., and leaves the energy exchange engine at a pressure $P_2$ of about 36 p.s.i.a. and at a temperature of about $-40°$ F. for flow through line 118 to the separator-concentrator vessel 104.

The $CO_2$ which separates in separator 104, leaves the separator through an outlet 120 at the top of the vessel, while the concentrated acid and methanol stream leaves the vessel 104 through an outlet 122 at the bottom of the vessel for flow through line 124 to a warm regeneration and $H_2S$ separation column (not shown).

Regenerated, cleaned methanol is recycled from the process through line 124 for entry into the energy exchange engine 100 at a pressure $P_2^1$ of about 36 p.s.i.a. In the energy exchange engine the regenerated methanol stream is pressurized to a pressure $P_1^1$ of about 480 p.s.i.a. for passage through line 110 to the wash column 102. Piping losses are compensated by pump 126 in line 124 downstream of the energy exchange engine 100.

Contamination of the regenerated clean methanol by leakage of high pressure methanol-acid components past the partitioning member during exchange pressurization of the clean methanol in the energy exchange engine 10 is prevented, in accordance with the practice of this invention, by the diaphragm loaded auxiliary vessel 130. In operation, clean methanol from line 110, or from an external source enters the vessel 130 from line 132 to reload the head end portion of the vessel 130. The contaminated methanol, displaced from the vessel in response to the introduction of such pressurized clean methanol, flows from the base portion of the vessel through line 134 to line 116, upstream of the energy exchange engine 100.

Prior to movement of the energy exchange engine 100 for pressurization of clean fluid by energy exchange with the contaminated fluid, pressure spikes are caused to take place only across clean fluid boundaries. This is accomplished via the auxiliary circuit whereby clean fluid is released under pressure from the head end portion of the vessel 130 for passage through line 136 prior to release of contaminated fluid under pressure from line 116.

FIG. 5 shows the circumferential displacement of the clean fluid pressurized port 87 ahead of the contaminated pressurizing arc 100 of admission of the contaminated fluid. This can be visualized in FIG. 5, that when partitioning member 87 has reached its stop, having discharged contaminated fluid and is filled with low pressure clean methanol, it will first be pressurized via the clean methanol pressurization arc of admission at 87 placed before the high pressure contaminated fluid arc of admission. Thus, when the tube reaches the contaminated pressurization arc, the clean fluid has already been pressurized via the clean metehanol. As a result, the pressure differential across the partitioning member can be kept low enough to eliminate any leakage past conventional piston rings or packings which operate reliably under existing pressure differentials, such as 2–3 p.s.i.a.

Figure 6:
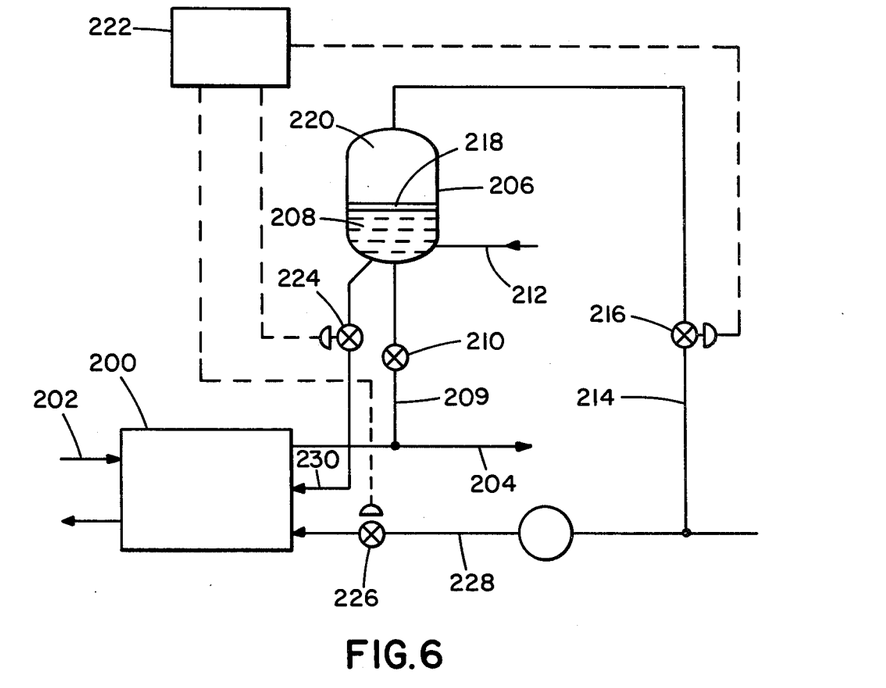
FIG. 6 is a diagrammatic showing of a simplified means embodying the features of this invention in work exchange engines of the types described.

It should be noted from FIGS. 4, 5 and 6, that there are two distinct process streams with pressure staged energy exchange engines positioned between the wash column 102 and the combined $CO_2$ separator-$H_2S$ concentration column 104. The upper stream contains $CO_2$ dissolved in methanol while the lower stream contains $H_2S$ and COS dissolved in methanol. In order to eliminate possibility of $H_2S$ contamination of the regenerated methanol, it is conceivable to include a trace $H_2S$ cleanup vessel downstream of the energy exchange engine.

FIG. 6 illustrates the use of an auxiliary circuit and diaphragm loaded vessel to minimize contamination of the clean regenerated methanol when pressurized by energy exchange with the contaminated high pressure methanol.

The clean methanol stream enters the energy exchange engine 200 at low pressure from line 202 and the pressurized clean methanol leaves the energy exchange engine through line 204. The lower part of the auxiliary vessel 206 is filled with clean methanol 208 via the high pressure clean discharge conduit 209, provided with a check valve 210 and/or when necessary through an external supply line 212. Use can also be made of an auxiliary working fluid that is compatible with methanol and which can be used with such auxiliary fluid being supplied from a separate source through line 212.

The top of the vessel is pressurized by the contaminated high pressure stream via conduit 214 provided with a control valve 216, with the space above the diaphragm 218 being occupied by the contaminated fluid 220. A control device 222 sequences valves 224, 216 and 226 in such manner that, prior to pressurization of the low pressure clean methanol via the contaminated high pressure conduit 228, said conduit is closed for a very short time by actuation of valve 226. At that time, valve 216 will be open, thus pressurizing the clean methanol 208 below the diaphragm 218. The latter will be connected by opening the control valve 224 to the conduit 230 which leads to the recessed portion 87 (FIG. 5) (or to line 56 in the reciprocating device in FIG. 3).

By simultaneously closing the inlet connection to conduit 202, and admitting clean high pressure fluid to recessed portion 87, the piston A will be pressurized—the discharge conduit 204 being temporarily closed—whereby the fluid column in tube 76 will become pressurized by clean fluid. As a result, no contamination of the clean fluid will occur during this transient pressurization process. After the control mechanism has sensed pressure equalization, control valve 210 is opened and valve 16 is closed. In response thereto, clean fluid 208 will flow into the lower part of the auxiliary vessel 206 via conduit 209.

The valve operations can be controlled by a microprocessor which senses the pertinent pressures as functions of time. The rotating energy exchange engine described lends itself to simple mechanical integration of the control functions.

It will be understood that the methanol may be replaced by other processing liquids and that the prepressurization to avoid leakage of impure liquid into a purified liquid during changeover may constitute the same liquid in a purified state or other non-contaminating liquid that preferably is compatible with the process liquid.

In order to minimize the amount of liquid or other fluid utilized during the initial repressurizing stage, it is desirable to locate the outlet from line 54 as close as possible to the end of the stroke of the partitioning member 10 thereby to reduce the space required to be filled by the clean fluid from the vessel 50. The amount is at a minimum in the rotary type of engine where the space required to be filled is the cavity 87 between the low pressure and high pressure arcs (FIG. 5).

It will be understood that the concepts described are applicable to various processing systems wherein pressure is transferred for pressure equalization from a high pressure fluid to a low pressure fluid with a movable partitioning member in between.

It will be further understood that changes may be made in details of construction and operation, without departing from the concepts of this invention, as defined in the following claims.

I claim:

1. Apparatus for the transfer of pressure energy from a first fluid at high pressure to a second fluid at low pressure without contamination of the second fluid by the first fluid during displacement of the second fluid at low pressure by the first fluid at high pressure comprising separating the first and second fluids by a separating member which is freely movable within a confining chamber, with the chamber at one side of the separating member communicating with the first fluid and with the chamber at the other side of the separating member communicating with the second fluid, means for delaying the introduction of the first fluid into the chamber, means for introducing the second fluid into the one side so that the separating member is exposed to a clean fluid at high pressure for substantial equalization of the pressures on opposite sides of the separating member, and then introducing the first fluid at high pressure for continued displacement of the separating member.

2. The apparatus as claimed in claim 1 in which the confining chamber comprises a cylindrical member and the separating member comprises a free floating partitioning member mounted for reciprocal movement within the cylindrical member.

3. The apparatus as claimed in claim 2 in which the cylindrical member has an inlet at one end for the introduction of fluid at high pressure and an outlet at the other end for the removal of fluid.

4. Apparatus as claimed in claim 1 in which the delaying means comprises means for exposing the other side of the separating member to clean fluid immediately in advance of exposure of the one side of the separating member to the first fluid at high pressure whereby pressure equalization is substantially achieved on the opposite sides of the separating member before the separating member is exposed to the first fluid at high pressure.

5. Apparatus as claimed claim 1 in which the clean fluid is the second fluid raised to high pressure.

6. Apparatus as claimed in claim 1 in which the clean fluid is a non-contaminating fluid at high pressure.

7. Apparatus as claimed in claim 1 in which the means for exposure of the one side of the separating member to clean fluid at high pressure comprises a vessel, subdividing means within the vessel subdividing the vessel into a clean fluid compartment and a first fluid compartment, means communicating the first fluid compartment with the first fluid at high pressure, means communicating the clean fluid compartment with a source of clean fluid into the clean fluid compartment with corresponding displacement of first fluid from the first fluid compartment, means communicating the clean fluid compartment with the one side of the chamber for introduction of clean fluid into the one side of the chamber in response to introduction of first fluid into the first fluid compartment, and valve means for regulating the flow of fluids into and out of the compartments.

8. Apparatus as claimed in claim 7 in which when the clean fluid is the second fluid the source of clean fluid is the portion of the second fluid displaced from the chamber.

9. Apparatus as claimed in claim 7 in which the subdividing means comprises a flexible diaphragm.

10. Apparatus as claimed in claim 7 in which the subdividing means comprises a piston mounted for free reciprocal movement within the vessel.

11. Apparatus for the transfer of pressure energy from a first fluid at high pressure to a second fluid at low pressure without contamination of the second fluid by the first fluid during displacement of the second fluid at low pressure by the first fluid at high pressure comprising separating the first and second fluids by a separating member which is freely movable within a confining chamber, with the chamber at one side of the separating member communicating with the first fluid and with the chamber at the other side of the separating member communicating with the second fluid means for delaying the introduction of the first fluid into the chamber, means for introducing the second fluid into the one side so that the separating member is exposed to a clean fluid at high pressure for substantial equalization of the pressures on opposite sides of the separating member wherein the separating member comprises a pair of separating members with a common space in between, means communicating the common space with a source of clean fluid to fill the space with clean fluid whereby the separating member communicating with the first fluid is exposed at least initially to clean fluid until substantial pressure equalization is reached.

12. A method for transfer of pressure energy from one fluid at high pressure to another fluid at low pressure without contamination of the other fluid by the one fluid during displacement of the other fluid by the one fluid comprising providing a confining chamber having a separating member mounted in sealing relation within the chamber and for free floating movement within the chamber, introducing the one fluid at high pressure into the chamber at one side of the separating member and removing the other fluid from the chamber at the one side of the separating member, and exposing the side of the separating member at the one side to a clean fluid at high pressure before the one fluid is introduced into the chamber until the pressure on the opposite sides of the separating members are substantially equalized before introduction of the first fluid at high pressure into the chamber.

13. The method as claimed in claim 12 in which the clean fluid is the other fluid removed from the chamber.

14. The method as claimed in claim 12 in which the clean fluid is a fluid which does not contaminate the second fluid.

15. The method as claimed in claim 12 in which the clean fluid is displaced into contact with the separating member in response to pressure displacement of the clean fluid by the first fluid from a separate vessel.

* * * * *